United States Patent
Chikazawa et al.

(12) 
(10) Patent No.: US 6,866,708 B2
(45) Date of Patent: Mar. 15, 2005

(54) AQUEOUS RELEASE AGENT COMPOSITION FOR MOLDING POLYURETHANE FOAM

(75) Inventors: Masateru Chikazawa, Gifu (JP); Haruyuki Mizuno, Aichi (JP)

(73) Assignee: Chyukyo Yushi Co., Ltd., Nagoya (JP)

( * ) Notice: Subject to any disclaimer, the term of this patent is extended or adjusted under 35 U.S.C. 154(b) by 0 days.

(21) Appl. No.: 10/368,562

(22) Filed: Feb. 20, 2003

(65) Prior Publication Data

US 2003/0214078 A1 Nov. 20, 2003

(30) Foreign Application Priority Data

May 17, 2002 (JP) ........................................ 2002-142825
Sep. 24, 2002 (JP) ........................................ 2002-278098

(51) Int. Cl.[7] ............................. B28B 7/36; B28B 7/38; B22C 3/00
(52) U.S. Cl. ................... 106/38.2; 106/38.22; 264/338; 264/240
(58) Field of Search ............................. 106/38.2, 38.22; 264/338, 240

(56) References Cited

U.S. PATENT DOCUMENTS

| 4,609,511 | A | 9/1986 | Fischer et al. |
| 4,936,917 | A | 6/1990 | Harakal et al. |
| 4,969,952 | A | 11/1990 | Hattich et al. |
| 5,028,366 | A | 7/1991 | Harakal et al. |
| 6,162,290 | A | 12/2000 | Schneider et al. |

FOREIGN PATENT DOCUMENTS

| JP | 61076324 | 4/1986 |
| JP | 62234015 | 10/1987 |
| JP | 6226752 | 8/1994 |
| JP | 9-141671 | 6/1997 |
| JP | 09141671 | 6/1997 |
| JP | 2001096542 | 4/2001 |

Primary Examiner—Michael Marcheschi
(74) Attorney, Agent, or Firm—Armstrong, Kratz, Quintos, Hanson & Brooks, LLP

(57) ABSTRACT

A release agent composition for molding a polyurethane foam is disclosed. The agent is obtained by blending a cationic surfactant having an amino acid salt of alkyl amine, a predetermined substance having release characteristic and a film forming agent. Furthermore, it is preferable that a polyethylene glycol type non-ionic surfactant with an additional number of ethylene oxide in the range from 1 to 15 moles, preferably, in the range from 5 to 10 moles is used in combination.

17 Claims, No Drawings

AQUEOUS RELEASE AGENT COMPOSITION FOR MOLDING POLYURETHANE FOAM

BACKGROUND OF THE INVENTION

1. Field of the Invention

The present invention relates to an aqueous release agent composition for molding polyurethane foam.

2. Description of Related Art

As a release agent for molding polyurethane foam, solvent based release agents have been used for a long time, however, an aqueous release agent has been proposed as a substitute for the above-described solvent based release agents from the view points of problems such as flammability of an organic solvent, working environment and the like (see Japanese Unexamined Patent Publication No.H09-141671 gazette).

In the invention disclosed in the above-described patent publication gazette, in an aqueous release agent their attention has been exclusively turned to, a film forming agent comprising naphthenic hydrocarbon compounds or paraffin based hydrocarbon compounds, and its improvement has been contemplated, thereby providing a release agent which is soluble in water and provides excellent release performance and work performance.

SUMMARY OF THE INVENTION

Prior art surfactants are not suitable for use in aqueous release agent compositions, due to various insufficiencies.

For example, volatile aliphatic amine salts such as morpholine stearate or the like have been used as surfactant agents in a release agent for molding polyurethane foam. However, when morpholine stearate is used as the surfactant, large amounts are required in order to stabilize there lease agent. For example, 20–50 weight percent of morpholine stearate is required with respect to 100 weight percent of the release component. However, if the amount of a surfactant used becomes large, the release performance of the release agent is negatively affected.

Cationic surfactants including inorganic acid salts (hydrochloride or the like) of alkyl amine or a lower carbon salts (acetic acid salt or the like), are known. However, when the former is used as a release agent for molding polyurethane foam, mold corrosion becomes a problem. In the case of the latter, the odor of the surfactant is irritating and thus creates a negative work environment.

The use of large amounts of morpholine stearate in the release agent composition also creates a negative work environment because morpholine stearate is volatile.

Furthermore, since film forming agents including naphthenic hydrocarbon compounds or paraffin based hydrocarbon compounds are also generally volatile, the use of these compounds also creates a neagtive work environment.

The present invention solves at least one of the above-described problems and is described as follows:

an aqueous release agent composition for molding polyurethane foam comprising, an amino acid salt of alkyl amine, a release substance, and a film forming agent.

Hereinafter, the present invention will be described in detail.

(Amino Acid Salt of Alkyl Amine)

It is preferable that the blending amount of an amino acid salt of an alkyl amine with respect to 100 weight percent of a release substance (substance having release nature: wax or the like, described hereinafter) is in the range of 1–50 weight percent. If the blending amount of the amino acid salt of the alkyl amine is less than one weight percent, an emulsification can not be formed, and if the blending amount of it exceeds 50 weight percent, the release performance of the release agent is lowered, therefore neither of these are preferred.

A further preferred blending amount of an amino acid salt of an alkyl amine with respect to 100 weight percent of the release substance is in the range of 1–20 weight percent, and a still further preferred blending amount of the amino acid salt of the alkyl amine with respect to 100 weight percent of the release component is in the range of 3–10 weight percent.

Thus, when the amino acid salt of an alkyl amine of the present invention is utilized as a the surfactant, the amount required is reduced as compared to the amount of morpholine stearate conventionally used. Accordingly, the present inventors have discovered that the release agent can be stabilized using an amount of surfactants that is approximately $1/3$–$1/5$ (weight ratio) of the amount of morpholine stearate used conventionally.

Preferably, the number of carbons of an alkyl group of the alkyl amine is in the range from 12 to 24. If the number of carbons of the alkyl group is less than 12, the emulsification becomes unstable and the stability of the release agent composition is lowered. On the other hand, if the number of carbons of the alkyl group exceeds 24, emulsification is insufficient, and the components of the release agent composition may separate.

Suitable alkyl groups are straight chain or branched alkyl groups.

In general, the amino acid is a solid weak acid, and it seldom corrodes the metal of the mold or the like. Moreover, since the amino acid has no irritating smell, for example as opposed to acetic acid, it does not adversely affect the work environment.

Preferable amino acids include amino acids having two carboxyl groups in particular, it is preferable that one or both of aspartic acid and glutamic acid, which are acidic amino acids, are employed.

When the amino acid includes two carboxyl groups, a the surfactant is a cationic surfactant.

When a surfactant comprising such an amino acid salt of alkyl amine has been blended in an aqueous release agent composition for molding polyurethane foam, as shown in Example 1 (see Tables 1–3) or Example 7 (see Tables 4–6), excellent release performance properties (in release characteristic, cell opening characteristic, surface roughening, drying characteristic) and excellent workability (in odor and corrosiveness) were obtained.

On the other hand, in the case where the conventional surfactant morpholine stearate was used to stabilize the release agent composition, the amount required was over 3 times (weight ratio) more than that required in Example 1 utilizing the present surfactant (or Example 7) as shown in Comparative Example 1 (or Comparative Example 4). As a result, the release performance using morphoine stearate is inferior to that of Example 1 (or Example 7). Moreover, since morpholine, which is a volatile amine, is used in a large amount, the work environment is adversly affected.

The inferior drying characteristics obtained in Comparative Example 1 (or Comparative Example 4) are, in general, capable of being resolved by the addition of a leveling agent and by preventing the release agent composition from forming droplets on the mold surface.

The present inventors have discovered that, some non-ionic surfactants, exhibit leveling performance characteristics including for example, preferably, polyethylene glycol type non-ionic surfactants. Accordingly, such a polyethylene glycol type non-ionic surfactant was added in Examples 2–4 (or Examples 8–10), and resulted in enhanced leveling characteristics. Thereby, the drying characteristics were also enhanced.

With regard to the polyethylene glycol type non-ionic surfactant, it is preferable that the additional number of moles of ethylene oxide is in the range of from 1 to 15 moles and it is further preferable that it is in the range of from 5 to 10 moles. If the additional number of moles of ethylene oxide exceeds 15 moles, there lease characteristics are worse because the ethylene oxide group reacts with isocyanate (see Comparative Example 3 or Comparative Example 6).

Moreover, when the additional number of moles of ethylene oxide is 5 moles or more, the leveling characteristics are enhanced.

It is preferable that the polyethylene glycol type non-ionic surfactant is blended in combination with the amino acid salt of the alkyl amine in total, in the range of from 1 to 100 weight percent with respect to 100 weight percent of the release substance. It is more preferable that the total in the range of from 5 to 50 weight percent of them is blended. It is still more preferable that the total in the range of from 5 to 40 weight percent is blended. It is preferable that the blending ratio of the amino acid salt of the alkyl amine and the polyethylene glycol type non-ionic surfactant is in the range of from 1:0 to 1:10. It is more preferable that it is in the range of from 1:1 to 1:5.

Suitable polyethylene glycol type non-ionic surfactants include ethylene oxide adducts such as alkyl amine, higher alcohol, alkyl phenol, aliphatic amide, polypropylene glycol, fats and fatty oils, polyvalent alcohol aliphatic ester, fatty acid and the like.

In the polyethylene glycol type non-ionic surfactant, in the case of ethylene oxide adduct of alkyl amine, when the additional number of moles of ethylene oxide is small, the large difference with alkyl amine (without ethylene oxide adduct) does not occur from the viewpoint of the reactivity with amino acid (generation of salt). For example, as shown in Example 5 (or Example 11), when an alkyl amine having one additional mole_ of ethylene oxide was used, almost the same performance as observed in Example 1 (or Example 7) was obtained.

When the additional amount of ethylene oxide with respect to alkyl amine is less than 5 moles, more preferably one mole or less, although the relevant ethylene oxide is added, the amino acid salt is formed and it is effective as a cationic surfactant.

From the description above, if the present invention is observed from another viewpoint, the present invention is described in that amino acid is selected as its acid component when a cationic surfactant is employed in an aqueous release agent composition for molding polyurethane foam.

As described above, an amino acid is preferable from the viewpoint of the work environment since its corrosiveness with respect to the metal such as the mold or the like is slight and it has no irritating smell.

Such amino acids, preferably include an amino acid having two carboxyl groups. Among these, glutamic acid and/or asparaginic acid, which are acidic amino acids, are preferable.

In a cationic surfactant, it is preferable that the basic side is alkyl amine, and it is preferable that the number of carbon atoms of the alkyl group is in the range of from 12 to 24. If the number of carbons of the alkyl group is less than 12, the emulsification becomes unstable and the stability of the release agent composition is lowered. On the other hand, if the number of carbon atoms exceeds 24, the emulsification is insufficient, and the components of the release agent composition may separate.

The alkyl group may be a straight chain or a branched alkyl group.

Less than 5 moles of ethylene oxide, or more preferably one mole or less of ethylene oxide, may be added to this alkyl amine.

The following components are blended in an aqueous release agent composition for molding polyurethane foam.

(Release Substance)

The present release substance includes, for example, a straight chain wax including, a straight chain polyethylene wax, a highly pure purified paraffin wax, fishertropsch and the like. It is preferable that the average molecular amount of the straight chain wax is in the range from 500 to 1000. Moreover, it is more preferable that the release substance contains 50% or more of the straight chain wax, with respect to the total release substance. Carnauba wax, montan wax, microcrystalline wax, branched polyethylene wax, silicon and the like are capable of being used, however, it is preferable that the blending ratio of these is less than 50% of the release substance.

(Film Forming Agent)

The term "film forming agent" refers to as a substance for resolving one portion of or the whole of, the release substance by the temperature of the mold surface, and making it in a uniform film shape after the release agent composition is coated on the mold. If the relevant film forming agent is not added, the release agent film has powder attached, thus when the urethane raw material is injected, the film is not maintained due to impact from injection, which causes cell roughening and voids. In a urethane molding process, since urethane raw material is injected immediately after the release agent composition is applied, it is necessary to swiftly form the release agent film. Therefore, it is preferable that the film forming agent is a substance that is a liquid at 40–80° C. or less which is the temperature of the mold at the time urethane is generally molded. It is more preferable that the film forming agent is a substance that is in a liquid state at 20° C.

Moreover, in order to function as a film forming agent, the resolvability with the release substance is important, hydrocarbon compounds containing hydrophilic groups having a hydroxyl group, carboxyl group or the like are not suitable for a use as the film forming agent of the present invention. Hence, similar to the release substance, hydrophobic hydrocarbon compounds are suitable for use, and are preferably a hydrocarbon compounds in a liquid state at 20° C.

According to the first aspect of the present invention, a solvent based film forming agent can be used. Such a film forming agents include naphthen based hydrocarbon compounds and paraffin based hydrocarbon compounds. The additional amount of such a film forming agent is preferably in the range from 50 to 500 weight percent with respect to 100 weight percent of the release substance. In the case where the additional amount is less than 50 weight percent, regular molecular sequence of the release substance is not sufficiently performed, and thus the cell opening characteristics of the molded product become worse. If the additional amount exceeds 500 weight percent, the emulsion necessary for emulsification is required even more and the bad influence of the emulsion appears and the cell opening characteristics of the molded product are lowered.

Suitable solvent based film forming agents, include organic compounds having a boiling point in the range of from 150 to 250° C. For example, suitable organic compounds include (a) hydrocarbons including, nonan, decane, unbenzene, tetralin, isopropylbenzene, cyclohexylbenzene, paraffin based hydrocarbon mixtures (number of carbon atoms 10–13), naphthenic hydrocarbon mixtures (number of carbon atoms 11–13) and the like, (b) halides include , p-chlorotoluene, hexachloroethane, trichlorobenzene, bromobenzene, octyl bromide and the like listed, and (c) ethers include, anisole, phenetole, cresylmethyl ether, ethylbenzyl ether, butylphenyl ether and the like. Moreover, these compounds may be used in a mixture. Preferably the organic compounds are (a) hydrocarbons. Among these, naphthenic hydrocarbon, paraffin based hydrocarbon and the mixture of paraffin based and naphthenic hydrocarbons are more preferable from the viewpoints of the safety to the human body and environment.

According to another aspect of the invention, a non-solvent based film forming agent can be used. Suitable non-solvent film forming agents preferably include, organic compounds whose vapor pressure at 20° C. is less than 0.01 kPa. Since such a film forming agent has a sufficiently low vapor pressure, it hardly volatilizes under urethane foam molding conditions.

Suitable non-solvent film forming agents include, for example, hydrocarbons including, (a) aromatic hydrocarbon mixtures, (b) polycyclic aromatic hydrocarbon mixtures, (c) paraffin based hydrocarbon mixtures, (d) naphthenic mixtures and the like, and (e) halogenation hydrocarbons and the like. Preferable film forming agents are, (a) aromatic hydrocarbon mixtures, (b) polycyclic aromatic hydrocarbon mixtures, (c) paraffin based hydrocarbon mixtures, and (d) naphthenic hydrocarbon mixtures, and these compounds may be used in a mixture. Moreover, these and some other than hydrocarbons may be mixed.

It is preferable that the additional amount of non-solvent based film forming agent is in the range of from 5 weight percent or more to less than 100 weight percent with respect to 100 weight percent of the release substance. If the additional amount is less than 5 weight percent, the film forming of the release substance is not sufficiently performed (see Comparative Example 5), and the cell opening characteristics of the molded product worsen. If the additional amount is 100 weight percent or more, the surface of the molded body does not form an open cell structure, and cell roughening and voids are caused, thereby worsening the release characteristics (see Comparative Example 6). A more preferable blending amount of a film forming agent is in the range of from 10 to 80 weight percent with respect to 100 weight percent of the release substance. It is still more preferable that it is in the range of from 20 to 50 weight percent.

(Additive)

The present aqueous release agent composition may contain an insecticide, a foam stabilizer, a wetting agent, a leveling agent, an antifoaming agent and the like, as an additive, where the additive is used in conventional small amounts.

(Method of Manufacture)

The method for manufacturing an aqueous emulsion of the present invention is described below. First, a material having release characteristic (release substance), solvent, and the other components are added together and heated, melted and mixed at 110–120° C. The resultant mixture is then gradually added to an aqueous solution of surfactant at 90° C. or more and simultaneously mixed using a homo-mixer to form an emulsion. Subsequently, the produced emulsion is homogenized to produce a fine emulsion composition. The obtained fine emulsion is then cooled to room temperature to obtain a stable emulsion composition. It is noted that in the above-described method, a the release substance, the solvent, and the other components may be mixed after each of them has been separately emulsified.

(Application to Polyurethane Foam Manufacture Step)

The present release agent composition, which is similar to a general purpose release agent composition, is coated on the interior of a metal mold by spraying or by another method, and a film is formed within the interior of the metal mold. Subsequently, urethane material is injected into the metal mold having a film formed therein, and the molding steps are carried out.

As described above, an amino acid salt of alkyl amine is employed as the cationic surfactant of the present aqueous release agent composition for molding polyurethane foam. The cationic surfactant allows the release agent composition emulsion to be stabilized using only a small amount of the cationic surfactant as compared to the amount of anionic morpholine stearate conventionally required. Thus, because less surfactant is required, the release performance (release characteristic, cell-opening characteristic and the like) of the release agent composition is enhanced.

It is noted that when alkyl amine is used, a small amount of ethylene oxide may be added to it.

Furthermore, when a non-solvent based film forming agent is used having a low in vapor pressure vaporization of organic materials from the release agent composition during the urethane foam molding process is prevented, and thus the work environment is enhanced.

Moreover, according to the present invention, since a surfactants containing a volatile substances like morpholine stearate, are not used, the work environment is also enhanced.

DESCRIPTION OF THE PREFERRED EMBODIMENTS

Hereinafter, Examples and Comparative Examples are shown in order to make the present invention clearer.

In Examples and Comparative Examples listed in Table 1–Table 3, a solvent based film forming agent has been blended.

In Examples and Comparative Examples listed in Table 4–Table 6, a non-solvent based film forming agent has been blended.

TABLE 1

Examples and Comparative Examples

|  | Example 1 | Example 2 | Example 3 | Example 4 | Example 5 | Example 6 | Comparative Example 1 | Comparative Example 2 | Comparative Example 3 |
| --- | --- | --- | --- | --- | --- | --- | --- | --- | --- |
| Wax A (note 1) | 2.0 | 2.0 | 2.0 | 2.0 | 2.0 | 2.0 | 2.0 | 2.5 | 2.0 |
| Wax B (note 2) | 2.0 | 2.0 | 1.5 | 1.5 | 2.0 | 1.5 | 2.0 | 1.0 | 1.5 |
| Wax C (note 3) |  |  |  |  |  |  |  | 0.5 |  |
| Wax D (note 4) |  |  | 0.5 | 0.5 |  | 0.5 |  |  | 0.5 |
| Hydrocarbon based solvent E (note 5) | 10.0 | 5.0 |  | 10.0 | 10.0 | 10.0 | 10.0 |  |  |
| Hydrocarbon based solvent F (note 6) |  |  | 5.0 |  |  |  |  | 5.0 | 5.0 |

TABLE 1-continued

Examples and Comparative Examples

| | Example 1 | Example 2 | Example 3 | Example 4 | Example 5 | Example 6 | Comparative Example 1 | Comparative Example 2 | Comparative Example 3 |
|---|---|---|---|---|---|---|---|---|---|
| Alkyl amine G (note 7) | 0.3 | 0.2 | 0.2 | | | | | 0.3 | 0.3 |
| Alkyl amine H (note 8) | | | | 0.2 | | | | | |
| Glutamic acid (note 9) | 0.1 | | 0.1 | | 0.1 | | | | 0.1 |
| Asparaginic acid (note 10) | | 0.1 | | 0.1 | | 0.1 | | | |
| Acetic acid (note 11) | | | | | | | | 0.1 | |
| Alkyl amine ethylene oxide adduct (note 12) | | | | | 0.3 | 0.3 | | | |
| Alkyl amine ethylene oxide adduct (note 13) | | 0.1 | 0.1 | 0.1 | | 0.1 | | | |
| Higher alcohol ethylene oxide adduct (note 14) | | | 0.5 | | | | | | |
| Higher alcohol ethylene oxide adduct (note 15) | | | | 0.5 | | 0.5 | | 0.5 | |
| Higher alcohol ethylene oxide adduct (note 16) | | | | | | | | | 0.5 |
| Alkylphenol ethylene oxide adduct (note 17) | | 0.5 | | | | | | | |
| Morpholine stearate | | | | | | | 1.5 | | |
| Water | 85.6 | 90.1 | 90.1 | 85.1 | 85.6 | 85.0 | 84.5 | 90.1 | 90.1 |

TABLE 2

Description of blending components on table 1

| | |
|---|---|
| Wax A (note 1) | Petrolite: "POLYWAX 500" |
| Wax B (note 2) | Petrolite: "POLYWAX 655" |
| Wax C (note 3) | Petrolite: "POLYWAX 850" |
| Wax D (note 4) | Petrolite: "BE SQUARE 195A" |
| Hydrocarbon based solvent E (note 5) | Exxon Mobile: "EXXOL D-40" |
| Hydrocarbon based solvent F (note 6) | Shell Japan: "Shellzole D-70" |
| Alkyl amine G (note 7) | Kaoh: "Farmin 86T" |
| Alkyl amine H (note 8) | Kaoh: "Farmin 80" |
| Glutamic acid (note 9) | Ajinomoto: "L-glutamic acid" |
| Asparaginic acid (note 10) | Ajinomoto: "asparaginic acid" |
| Acetic acid (note 11) | Kanto Chemical: "reagent chemical; acetic acid" |
| Alkyl amine ethylene Oxide adduct (note 12) | Aoki Fats and Fatty Oils: "Brownon S-201" (EO = 1)*1 |
| Alkyl amine ethylene Oxide adduct (note 13) | Aoki Fats and Fatty Oils: "Brownon S-207" (EO = 7) |
| Higher alcohol ethylene oxide adduct (note 14) | Aoki Fats and Fatty Oils: "Brownon SR-707" (EO = 7) |
| Higher alcohol ethylene oxide adduct (note 15) | Kaoh: "Emulgen 108" (EO = 8) |
| Higher alcohol ethylene oxide adduct (note 16) | Kaoh: "Emulgen 130K" (EO = 30) |
| Alkylphenol ethylene oxide adduct (note 17) | Aoki Fats and Fatty Oils: "Brownon N-510" (EO = 10) |

*1: EO represents ethylene oxide. The number represents additional mole number.

TABLE 3

| | Example 1 | Example 2 | Example 3 | Example 4 | Example 5 | Example 6 | Comparative Example 1 | Comparative Example 2 | Comparative Example 3 |
|---|---|---|---|---|---|---|---|---|---|
| release characteristic (kg) | ⊚ | ⊚ | ⊚ | ⊚ | ⊚ | ⊚ | Δ | ⊚ | x |
| cell-opening characteristic | ⊚ | ⊚ | ⊚ | ⊚ | ⊚ | ⊚ | ○ | ⊚ | x |
| surface roughening | ○ | ○ | ○ | ○ | ○ | ○ | Δ | ○ | ○ |
| drying characteristic | Δ | ○ | ○ | ○ | Δ | ○ | x | ○ | ○ |
| smell | ○ | ○ | ○ | ○ | ○ | ○ | ○ | x | ○ |
| corressiveness | ○ | ○ | ○ | ○ | ○ | ○ | ○ | x | ○ |

TABLE 4

Examples and Comparative Examples

| | Example 7 | Example 8 | Example 9 | Example 10 | Example 11 | Example 12 |
|---|---|---|---|---|---|---|
| Wax A (note 1) | 2.5 | 2.0 | 2.0 | 2.0 | | 2.0 |
| Wax B (note 2) | 2.0 | 2.0 | 1.5 | 1.5 | 2.0 | 2.0 |
| Wax C (note 3) | | | | | 2.0 | |
| Wax D (note 4) | | | 0.5 | 0.5 | | 0.5 |
| Film forming agent E (note 5) | 3.0 | | | | 3.0 | |
| Film forming agent F (note 6) | | 2.0 | | | | 2.0 |
| Film forming agent G (note 7) | | | 1.0 | | | |
| Film forming agent H (note 8) | | | | 0.5 | | |
| Hydrocarbon based solvent I (note 9) | | | | | | |
| Hydrocarbon based solvent J (note 10) | | | | | | |
| Alkyl amine K (note 11) | 0.3 | 0.2 | 0.2 | | | |
| Alkyl amine L (note 12) | | | | 0.2 | | |
| Glutamic acid (note 13) | 0.1 | | 0.1 | | 0.1 | |
| Asparaginic acid (note 14) | | 0.1 | | 0.1 | | 0.1 |
| Acetic acid (note 15) | | | | | | |
| Alkyl amine ethylene Oxide adduct (note 16) | | | | | 0.3 | 0.3 |
| Alkyl amine ethylene Oxide adduct (note 17) | | 0.1 | 0.1 | 0.1 | | 0.1 |
| Higher alcohol ethylene oxide adduct (note 18) | | | 0.5 | | | |
| Higher alcohol ethylene oxide adduct (note 19) | | | | 0.5 | | 0.5 |
| Higher alcohol ethylene oxide adduct (note 20) | | | | | | |
| Alkylphenol ethylene oxide adduct (note 21) | | 0.5 | | | | |
| Morpholine stearate | | | | | | |
| Water | 92.1 | 94.1 | 94.1 | 94.6 | 92.6 | 92.5 |

| | Comparative Example 4 | Comparative Example 5 | Comparative Example 6 | Comparative Example 7 | Comparative Example 8 | Comparative Example 9 |
|---|---|---|---|---|---|---|
| Wax A (note 1) | 3.0 | 3.0 | 3.0 | 3.0 | 2.0 | 2.0 |
| Wax B (note 2) | 2.0 | 1.0 | 1.5 | 2.0 | 2.0 | 2.0 |
| Wax C (note 3) | | 0.5 | | | | |
| Wax D (note 4) | | | 0.5 | | 0.5 | 0.5 |
| Film forming agent E (note 5) | | | | | | |
| Film forming agent F (note 6) | 2.0 | | | | | |
| Film forming agent G (note 7) | | | | | | |
| Film forming agent H (note 8) | | | | | | 10.0 |
| Hydrocarbon based solvent I (note 9) | | 2.0 | | | | |
| Hydrocarbon based solvent J (note 10) | | | 2.0 | 2.0 | | |
| Alkyl amine K (note 11) | | 0.3 | 0.3 | 0.3 | 0.2 | 0.2 |
| Alkyl amine L (note 12) | | | | | | |
| Glutamic acid (note 13) | | | 0.1 | 0.1 | 0.1 | 0.1 |
| Asparaginic acid (note 14) | | | | | | |
| Acetic acid (note 15) | | 0.1 | | | | |
| Alkyl amine ethylene Oxide adduct (note 16) | | | | | | |
| Alkyl amine ethylene Oxide adduct (note 17) | | | | 0.1 | 0.1 | 0.1 |
| Higher alcohol ethylene oxide adduct (note 18) | | | | | 0.5 | 0.5 |
| Higher alcohol ethylene oxide adduct (note 19) | | 0.5 | | 0.5 | | |
| Higher alcohol ethylene oxide adduct (note 20) | | | 0.5 | | | |
| Alkylphenol ethylene oxide adduct (note 21) | | | | | | |
| Morpholine stearate | 1.5 | | | | | |
| Water | 91.5 | 92.6 | 92.1 | 92.0 | 94.6 | 84.6 |

TABLE 5

Description of blending components on table 4

| | |
|---|---|
| Wax A (note 1) | Petrolite: "POLYWAX 500" |
| Wax B (note 2) | Petrolite: "POLYWAX 655" |
| Wax C (note 3) | Petrolite: "POLYWAX 850" |
| Wax D (note 4) | Petrolite: "BE SQUARE 195A" |
| Film forming agent E (note 5) | Exxon Mobile: "EXXOL D-110" vapor pressure (/20° C.): less than 0.01 kPa |
| Film forming agent F (note 6) | Exxon Mobile: "EXXOL D-130" vapor pressure (/20° C.): less than 0.01 kPa |
| Film forming agent G (note 7) | Nihon Sekiyo Chemical{}: "Hizol SAS-296" vapor pressure (/20° C.): less than 0.01 kPa |
| Film forming agent H (note 8) | Exxon Mobile: "CRYSTOL 70" vapor pressure (/20° C.): less than 0.01 kPa |
| Hydrocarbon based solvent I (note 9) | Exxon Mobile: "EXXOL D-40" vapor pressure (/20° C.): 0.183 kPa |
| Hydrocarbon based solvent J (note 10) | Exxon Mobile: "Isopar L" vapor pressure (/20° C.): 0.03 kPa |
| Alkyl amine K (note 11) | Kaoh: "Farmin 86T" |
| Alkyl amine L (note 12) | Kaoh: "Farmin 80" |
| Glutamic acid (note 13) | Ajinomoto: "L-glutamic acid" |
| Asparaginic acid (note 14) | Ajinomoto: "asparaginic acid" |
| Acetic acid (note 15) | Kanto Chemical: "reagent chemical; acetic acid" |
| Alkyl amine ethylene Oxide adduct (note 16) | Aoki Fats and Fatty Oils: "Brownon S-201" (EO = 1)*1 |
| Alkyl amine ethylene Oxide adduct (note 17) | Aoki Fats and Fatty Oils: "Brownon S-207" (EO = 7) |
| Higher alcohol ethylene oxide adduct (note 18) | Aoki Fats and Fatty Oils: "Brownon SR-707" (EO = 7) |
| Higher alcohol ethylene oxide adduct (note 19) | Kaoh: "Emulgen 108" (EO = 8) |
| Higher alcohol ethylene oxide adduct (note 20) | Kaoh: "Emulgen 130K" (EO = 30) |
| Alkylphenol ethylene oxide adduct (note 21) | Aoki Fats and Fatty Oils: "Brownon N-510" (EO = 10) |

*1: EO represents ethylene oxide. The number represents additional mole number.

to 50–55° C., the release agent composition was uniformly sprayed (about 30 g per 1 m$^2$) by an air-gun and drying for 2 minutes.

(2) Molding of polyurethane foam: 40 weight percent of polyol (MS-300; made by Mitsui Toatsu Chemical, Co., Ltd.) and 20 weight percent of TDI/MDI=1/1 as raw material were mixed and agitated for 5 seconds at 2000 rpm, and immediately after that, injected into the metal mold, and reacted at 50–55° C. with the lid closed. The metal mold was put into the thermostat at 50–50° C. and left for 10 minutes including the curing time.

(3) Evaluation of the release characteristic: a spring balance was set at the carrying handle of the above-described mold, and the lid was opened. The applied load was measured.

Evaluation standard: ⊙; 5–10 kg or less, ○; 10–15 kg; Δ; 15–20 kg, and X; 20 kg or more.

(4) Evaluation for cell-opening characteristic of molding foam: the number of the entire cells within the square of 5 cm×5 cm on the surface of the molded urethane foam and whether there are foam breakings of cells or not were visually observed and measured. The cell-opening ratio was made as a ratio of the number of foam breaking cells occupying in the total cell number. The cell-opening characteristic is preferably 60% or more. Evaluation standard: for cell-opening ratio: ⊙; 80% or more, ○; 60–80%; Δ; 40–60%, and X; 40% or less or not cell-opened.

(5) Dry characteristic: The duration from the time when the release agent was sprayed in the mold at the above-described temperature to the time when it was dried was measured. Evaluation standard: ⊙; within about 30 seconds, ○; within about 60 seconds, X; 60 seconds or more.

(6) Smell: the smell at the time when the release agent was sprayed on the mold at the above-described temperature was determined by a human. Evaluation standard: ○; no uncomfortable smell, X; uncomfortable smell.

(7) Corrosiveness: the moiety of the release agent was put in the sample bottle, in which the degreased iron was immersed. The bottle stood in the thermostat at 65° C. for 4

TABLE 6

| | Example 7 | Example 8 | Example 9 | Example 10 | Example 11 | Example 12 |
|---|---|---|---|---|---|---|
| release characteristic (kg) | ⊙ | ⊙ | ⊙ | ⊙ | ⊙ | ⊙ |
| cell-opening characteristic | ⊙ | ⊙ | ⊙ | ⊙ | ⊙ | ⊙ |
| surface roughening | o | o | o | o | o | o |
| drying characteristic | Δ | o | o | o | Δ | o |
| smell | o | o | o | o | o | o |
| corrosiveness | o | o | o | o | o | o |
| work environment | o | o | o | o | o | o |

| | Comparative Example 4 | Comparative Example 5 | Comparative Example 6 | Comparative Example 7 | Comparative Example 8 | Comparative Example 9 |
|---|---|---|---|---|---|---|
| release characteristic (kg) | Δ | ⊙ | x | ⊙ | x | Δ |
| cell-opening characteristic | ⊙ | ⊙ | x | ⊙ | x | Δ |
| surface roughening | Δ | o | o | o | Δ | x |
| drying characteristic | x | o | o | o | o | o |
| smell | o | x | o | o | o | o |
| corrosiveness | o | x | o | o | o | o |
| work environment | x | x | x | x | o | o |

Performance Test Method

In order to clarify the performance effects of the present invention, the performance test has been carried out on Examples and Comparative Examples as shown below.

(1) Coating of release agent: metal mold in core-box made of iron (interior size: vertical; 15 cm, horizontal; 20 cm, depth; 5 cm, with lid having a carrying handle) was heated hours, and the possible occurrence of rust was observed. Evaluation standard: ○; no occurrence of rust, X; occurrence of rust.

(8) Work environmental characteristic: The vapor pressure at 20° C. as the whole composition which was less than 0.01 kPa was represented by ○, and the vapor pressure at 20° C. as the whole composition which was 0.01 kPa or more was represented by X. It should be noted that the composition evaluated as ○ clears the standard of EU conference (COUNCIL DIRECTIVE, 1999/13/EC) concerning with volatile organic solvents. It should be noted that the following URL can be referred to for the relevant standard.
http://europa.eu.int/eur-lex/en/consleg/pdf/1999/en_1999L0 013_do_001.pdf
See B-17 of pp.5.

The present invention is not limited by the description of Embodiments and Examples at all. A variety of modified Embodiments are also included within the scope in which those skilled in the art can easily conceive without departing from the scope of the description of the claims.

We claim:

1. An aqueous release agent composition for molding polyurethane foam, comprising:
   an amino acid salt of an alkyl amine,
   a release substance, and
   a film forming agent,
   wherein said salt, said release substance and said film forming agent, are blended in amounts sufficient to form a stable emulsified aqueous release agent composition.

2. The aqueous release agent composition of claim 1, said film forming agent comprises a solvent based film forming agent or a non-solvent based film forming agent.

3. The aqueous release agent composition of claim 2, wherein said amino acid salt, said release substance and said solvent based film forming agent are present in a weight ratio of from 1–50:100:50–500, respectively, or said amino acid salt, said release substance and said non-solvent based film forming agent are present in a weight ratio of from 1–50:100:5–≦100, respectively.

4. The aqueous release agent composition as claimed in any one of claim 1 or 2, said amino acid comprises two carboxyl groups.

5. The aqueous release agent composition as claimed in claim 4, said amino acid is selected from the group consisting of asparaginic acid and glutamic acid.

6. The aqueous release agent composition as claimed in any one of claim 1 or 2, said alkyl amine comprises an alkyl group having from 12 to 24 carbon atoms.

7. The aqueous release agent composition as claimed in claim 1, further comprising a non-ionic surfactant.

8. The aqueous release agent composition as claimed in claim 7, said non-ionic surfactant comprising one or more members selected from the group consisting of polyethylene glycol, alkyl amine ethylene oxide adducts, higher alcohol ethylene oxide adducts, alkyl phenol ethylene oxide adducts, aliphatic amide ethylene oxide adducts, polypropylene glycol ethylene oxide adducts, ethylene oxide adducts of fats, ethylene oxide adducts of fatty oils, polyvalent alcohol aliphatic ester ethylene oxide adducts and fatty acid ethylene oxide adducts.

9. The aqueous release agent composition as claimed in claim 8, wherein said non-ionic surfactant adducts comprise an additional amount of ethylene oxides, said additional amount is from 1 to 15 moles.

10. The aqueous release agent composition as claimed in claim 9, wherein said additional amount of ethylene oxide is from 5 to 10 moles.

11. The aqueous release agent composition as claimed in claim 7, wherein said non-ionic surfactant is a polyethylene glycol non-ionic surfactant, and said amino acid salt and/or said polyethylene glycol non-ionic surfactant, and said release substance are present in a weight ratio of from 1–100:100, respectively.

12. The aqueous release agent composition as claimed in claim 2, said non-solvent based film forming agent comprises a hydrocarbon compound having a vapor pressure of less than 0.01 kPa at 20° C.

13. An aqueous release agent composition for molding polyurethane foam, comprising:
    a cationic surfactant comprising a salt produced by reacting an alkyl amine or an ethylene oxide adduct of an alkyl amine, wherein an additional amount of ethylene oxide in said adduct is less than 5 moles;
    an amino acid;
    a release substance; and
    a film forming agent.

14. An aqueous release agent composition for molding polyurethane foam, comprising:
    a cationic surfactant comprising a salt produced by reacting an alkyl amine or an ethylene oxide adduct of an alkyl amine, wherein an additional amount of ethylene oxide in said adduct is less than 5 moles;
    an amino acid;
    a release substance; and
    a non-solvent based film forming agent,
    wherein said non-solvent based film forming agent and said release substance are present in a weight ratio of 5–50:100, respectively.

15. A method for preparing a mold for manufacturing a molded urethane foam, comprising:
    preparing an aqueous release agent composition for molding a polyurethane foam, said aqueous release agent composition comprising an amino acid salt of an alkyl amine, a release substance, and a film forming agent; to produce said aqueous release agent composition, and
    providing said aqueous release agent composition on an inside surface of a mold to form a film of said aqueous release agent composition,
    wherein a urethane material is provided in said mold in contact with said film, such that said film allows release of said molded urethane foam.

16. A method for forming a release agent film of a release agent composition, comprising:
    preparing an aqueous release agent composition for molding a polyurethane foam, said aqueous release agent composition comprising an amino acid salt of an alkyl amine, a release substance, and a film forming agent; to produce said aqueous release agent composition, and
    providing said aqueous release agent composition on an inside surface of a mold to form said release agent film.

17. A method for manufacturing a urethane foam molded article, comprising:
    preparing an aqueous release agent composition for molding a polyurethane foam, said aqueous release agent composition comprising an amino acid salt of an alkyl amine, a release substance, and a film forming agent; to produce said aqueous release agent composition;
    forming an aqueous release agent film in a mold, comprising providing said aqueous release agent composition on an inside surface of said mold to form said aqueous release agent film;
    preparing a urethane foam composition to form a prepared foam composition;
    providing said prepared foam composition in said mold such that said prepared foam composition is in contact with said film to form a molded composition;
    reacting and curing said molded composition to form said urethane foam molded article.

* * * * *

UNITED STATES PATENT AND TRADEMARK OFFICE
CERTIFICATE OF CORRECTION

PATENT NO. : 6,866,708 B2  Page 1 of 1
APPLICATION NO. : 10/368562
DATED : March 15, 2005
INVENTOR(S) : Chikazawa et al.

It is certified that error appears in the above-identified patent and that said Letters Patent is hereby corrected as shown below:

On the title page:
In item (73):
change "Chyukyo Yushi Co., Ltd., Nagoya (JP)" to be -- Chukyo Yushi Co., Ltd., Nagoya (JP) --

Signed and Sealed this

Tenth Day of April, 2007

JON W. DUDAS
*Director of the United States Patent and Trademark Office*